United States Patent
Chang et al.

(10) Patent No.: US 10,547,378 B2
(45) Date of Patent: Jan. 28, 2020

(54) OPTICAL FIBER STATUS DETECTION METHOD, OPTICAL SUPERVISORY UNIT, AND STATION

(71) Applicant: HUAWEI TECHNOLOGIES CO., LTD., Shenzhen, Guangdong (CN)

(72) Inventors: Tianhai Chang, Shenzhen (CN); Rui He, Shenzhen (CN); Hao Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/830,792

(22) Filed: Dec. 4, 2017

(65) Prior Publication Data
US 2018/0123687 A1    May 3, 2018

Related U.S. Application Data

(63) Continuation of application No. PCT/CN2016/079232, filed on Apr. 14, 2016.

(51) Int. Cl.
| | |
|---|---|
| *H04B 10/071* | (2013.01) |
| *H04B 10/077* | (2013.01) |
| *H04B 10/25* | (2013.01) |
| *H04J 14/08* | (2006.01) |

(52) U.S. Cl.
CPC ....... *H04B 10/071* (2013.01); *H04B 10/0771* (2013.01); *H04B 10/25* (2013.01); *H04J 14/08* (2013.01)

(58) Field of Classification Search
None
See application file for complete search history.

(56) References Cited

U.S. PATENT DOCUMENTS 6,594,004 B1 * 7/2003 Makita ............... G01M 11/3145
356/73.1
6,671,469 B1 * 12/2003 Fukagawa ............ H04B 10/077
398/11

(Continued)

FOREIGN PATENT DOCUMENTS

| CN | 1655481 A | 8/2005 |
|---|---|---|
| CN | 1762113 A | 4/2006 |

(Continued)

OTHER PUBLICATIONS

Zhou Yu Rong et al: "Field trial demonstration of novel optical superchannel capacity protection for 400G using DP-16QAM and DP-QPSK with in—service OTDR fault localization", 2016 Optical Fiber Communications Conference and Exhibition (OFC), OSA, Mar. 20, 2016, XP032942809, 4 pages.

(Continued)

*Primary Examiner* — David W Lambert
(74) *Attorney, Agent, or Firm* — Fish & Richardson P.C.

(57) ABSTRACT

An optical fiber status detection method includes: alternately sending, by a first station, an optical time domain reflectometer (OTDR) pulse and optical supervisory channel (OSC) data to a second station on a same channel, where the second station is a neighboring station of the first station; and receiving, by the first station, reflection light returned by the OTDR pulse by using an optical fiber between the first station and the second station, and obtaining an OTDR probe value according to the reflection light.

12 Claims, 14 Drawing Sheets

(56) References Cited

U.S. PATENT DOCUMENTS

| | | | |
|---|---|---|---|
| 2003/0210387 A1* | 11/2003 | Saunders | H04B 10/071 |
| | | | 356/73 |
| 2004/0208501 A1 | 10/2004 | Saunders et al. | |
| 2005/0174563 A1 | 8/2005 | Evans et al. | |
| 2006/0182405 A1 | 8/2006 | Dorward et al. | |
| 2014/0241715 A1* | 8/2014 | Han | H04B 10/294 |
| | | | 398/38 |
| 2015/0043907 A1* | 2/2015 | Cavaliere | H04J 14/0247 |
| | | | 398/30 |
| 2015/0147067 A1* | 5/2015 | Ryan | H04B 10/116 |
| | | | 398/118 |

FOREIGN PATENT DOCUMENTS

| | | |
|---|---|---|
| CN | 101630972 A | 1/2010 |
| CN | 104601228 A | 5/2015 |
| WO | 0247293 A1 | 6/2002 |
| WO | 2004084439 A1 | 9/2004 |

OTHER PUBLICATIONS

Extended European Search Report issued in European Application No. 16898231.2 dated Jun. 25, 2018, 8 pages.
International Search Report and Written Opinion issued in International Application No. PCT/CN2016/079232 dated Jan. 18, 2017; 15 pages.
Chinese Office Action issued in Chinese Application No. 201680029519.x dated Mar. 15, 2019, 9 pages.

* cited by examiner

OPTICAL FIBER STATUS DETECTION METHOD, OPTICAL SUPERVISORY UNIT, AND STATION

CROSS-REFERENCE TO RELATED APPLICATIONS

This application is a continuation of International Patent Application No. PCT/CN2016/079232, filed on Apr. 14, 2016. The disclosure of the aforementioned application is hereby incorporated by reference in its entirety.

TECHNICAL FIELD

The present disclosure relates to the field of optical communications technologies, and in particular, to an optical fiber status detection method, an optical supervisory unit, and a station.

BACKGROUND

Currently, an optical time domain reflectometer (OTDR) is widely used for optical fiber line fault location. The OTDR is a precise photoelectric integration instrument made by means of back scattering generated by Rayleigh scattering and Fresnel reflection of a ray propagating in an optical fiber, is widely applied to maintenance and construction of optical cable lines, and is mainly used to measure a length of an optical fiber, propagation attenuation of the optical fiber, connector attenuation, fault location, and the like. However, a conventional OTDR is a handheld device. Using the OTDR as a test instrument is a scattered and passive manual maintenance means, higher optical fiber security requirements can be hardly ensured, and the OTDR is expensive. When a fault in an optical fiber line is determined, a worker needs to enter a station and switches off the optical fiber line to perform a test. A long location period and a long time of service interruption cause a relatively great economic loss.

To perform OTDR probe in time, the prior art proposes that the OTDR is directly made into an independent unit to be integrated in a device. As shown in FIG. 1, an OTDR unit uses a wavelength independent from a service unit and an optical supervisory unit, is connected to a multiplexing/demultiplexing unit, and may implement real-time online optical fiber status detection unidirectionally. However, for an optical add/drop multiplexer(OADM) station in a WDM system, to implement OTDR probe on optical fibers in an entire network, an OTDR unit needs to be configured for an egress in each direction. Therefore, not only many units are configured, but also a large amount of cabinet space or device slots need to be occupied. Consequently, device costs and installation costs are both very high.

To avoid configuring an OTDR unit for an egress in each direction, the prior art proposes that an OTDR unit is integrated in a station and a multipath optical switch for the OTDR unit is added to monitor optical fiber alarms in multiple directions in real time, thereby reducing costs for configuring OTDR units in multiple directions. However, real-time online optical fiber status detection cannot be implemented and line assembly is relatively complex.

Therefore, it can be known that the foregoing two solutions are both solutions in which an OTDR is used as an independent unit and integrated in a station, and does not share a wavelength with a service unit or an optical supervisory unit. Further, the foregoing two solutions need to modify an existing system card, for example, adding an access port of an OTDR unit to a multiplexing/demultiplexing unit. The integrated OTDR is an independent unit. Installation of the OTDR unit occupies space of a cabinet or a device slot, and has high costs.

SUMMARY

Embodiments of the present disclosure provide an optical fiber status detection method, an optical supervisory unit, and a station, so as to resolve prior-art problems of relatively high costs and complex assembly caused by separately integrating an OTDR unit.

Specific technical solutions provided in the embodiments of the present disclosure are as follows:

An embodiment of the present disclosure provides an optical fiber status detection method, including:

alternately sending, by a first station, an OTDR pulse and OSC data to a second station on a same channel, where the second station is a neighboring station of the first station; and receiving, by the first station, reflection light returned by the OTDR pulse by using an optical fiber between the first station and the second station, and obtaining an OTDR probe value according to the reflection light.

The same channel indicates using a same wavelength, a same wavelength set, or a same protocol data frame.

Optionally, before the first station alternately sends the OTDR pulse and the OSC data to the second station on the same channel, the first station receives an OTDR probe instruction delivered by a network management system, where the OTDR probe instruction includes a quantity N of OTDR probe values that need to be obtained during this time of OTDR probe, and N is a positive integer.

Optionally, after the first station receives the OTDR probe instruction delivered by the network management system and before the first station alternately sends the OTDR pulse and the OSC data to the second station on the same channel, the first station determines, according to the quantity N of the OTDR probe values and a preset quantity n of OTDR pulses sent for a single time, that OTDR pulse sending needs to be performed for M times. That is, the OTDR pulses are sent in fragments, thereby ensuring no packet loss and no bit error in OSC data communication between stations.

In this case, the first station may alternately send the OTDR pulse and the OSC data to the second station on the same channel in, but not limited to, the following two manners.

A first manner: in a wavelength division multiplexing system using Time Division Multiplexing (TDM) transmission, the first station may insert one time of OTDR pulse sending between any two adjacent OSC data frames until the M times of OTDR pulse sending are completed.

The quantity n of OTDR pulses sent for a single time is mainly determined by a buffer size of a buffer module of the optical supervisory unit in the first station, a service bandwidth, and a time for sending a single OTDR pulse.

When the first station sends the n OTDR pulses, because the current wavelength division multiplexing system uses a TDM transmission manner, a buffer module in a first optical supervisory unit of the first station buffers OSC data that should be sent during sending of the n OTDR pulses as first buffer data, and sends the first buffer data to the second station by using an OSC module in the first optical supervisory unit after sending of the n OTDR pulses is completed. Further, the buffer module in the first optical supervisory unit buffers the OSC data that should be sent during sending of the first buffer data as second buffer data, and sends the second buffer data by using the OSC module in the first optical supervisory unit after sending of the first buffer data is completed, and the rest can be deduced by analogy.

Generally, in a normal OSC data sending state, the optical supervisory unit does not occupy all egress bandwidths, reserves some redundancy bandwidths, and only occupies the redundancy bandwidth when the buffer module of the first optical supervisory unit has buffer data. Therefore, the OSC module in the first optical supervisory unit occupies all the egress bandwidths for sending the buffer data. After a period of time, the buffer module does not have buffer data, and recovers to a normal OSC data sending state.

A second manner: in a wavelength division multiplexing system using data packet transmission, the first station may insert at least one time of OTDR pulse sending between any two adjacent OSC data packets until the M times of OTDR pulse sending are completed.

The following several possible implementation manners are specifically included.

A first possible implementation manner: the first station may send OTDR pulses (that is, N pulses) for M times between any two adjacent OSC data packets, that is, sending, between any two adjacent OSC data packets in a centralized manner, the N pulses that need to be sent.

A second possible implementation manner: when determining that a current link is idle, the first station inserts at least one time of OTDR pulse sending during an interval of sending a maintenance packet, until the M times of OTDR pulse sending are completed.

A third possible implementation manner: when determining that an OSC data packet is being sent on a current link, the first station inserts at least one time of OTDR pulse sending during an interval of sending the OSC data packet, until the M times of OTDR pulse sending are completed.

Optionally, after the first station determines that the OTDR pulse sending needs to be performed for M times and before the first station alternately sends the OSC data and the OTDR pulse to the second station on the same channel, the first station may send an OTDR probe start instruction to the second station, and the OTDR probe start instruction is used to instruct the second station to switch from a receiving state of receiving the OSC data to a silent state of waiting for OTDR probe. Therefore, synchronization of the first station and the second station can be ensured, and it is ensured that the second station can latch incomplete OSC data in real time.

Optionally, after the first station sends the OTDR pulse to the second station and before the first station sends the OSC data to the second station (that is, during any alternate sending performed by the first station, after sending of the OTDR pulse is completed and before the OSC data continues to be sent), the first station may send a preset physical layer recovery message to the second station, and the preset physical layer recovery message is used to instruct the second station to switch from the silent state of waiting for OTDR probe to the receiving state of receiving the OSC data. When determining that a preset physical layer recovery acknowledgment message fed back by the second station is received, the first station sends the OSC data to the second station.

Optionally, after the first station sends the preset physical layer recovery message to the second station, when determining that a preset physical layer recovery acknowledgment message fed back by the second station is not received during preset duration, the first station sends the OSC data to the second station. Therefore, system reliability can be ensured, thereby avoiding that an optical fiber has a fault, and cannot recover to a receiving state in time to perform fault alarming during sending of the OTDR pulse.

An embodiment of the present disclosure provides an optical supervisory unit, including at least: an OTDR module, an OSC module, and a switching control module, where the OTDR module is configured to send an OTDR pulse, and obtain an OTDR probe value according to received reflection light returned by the OTDR pulse by using an optical fiber between a first station and a second station; the optical supervisory unit is located on the first station, and the second station is a neighboring station of the first station;

the OSC module is configured to send first OSC data to the second station and receive second OSC data sent by the second station; and the switching control module is configured to control the OTDR module and the OSC module to perform alternate sending of the OTDR pulse and the first OSC data, and forward the second OSC data sent by the second station to the OSC module.

Optionally, the optical supervisory unit further includes a buffer module.

The buffer module is configured to buffer OSC data generated when the OTDR module sends the OTDR pulse.

Optionally, the optical supervisory unit further includes an optical-to-electrical conversion module.

The optical-to-electrical conversion module is configured to convert the OTDR pulse to a corresponding optical signal, convert an electrical signal corresponding to the first OSC data to a corresponding optical signal, and convert a received optical signal corresponding to the second OSC data to a corresponding electrical signal.

An embodiment of the present disclosure further provides a station, including a service unit, an optical supervisory unit, a main control unit, and a multiplexing/demultiplexing unit. The optical supervisory unit can implement optical fiber status detection in the foregoing embodiment.

In the embodiments of the present disclosure, an OTDR pulse and OSC data are alternately sent to a second station on a same channel, thereby resolving problems of relatively high costs and complex assembly caused by separately integrating an OTDR unit in a WDM system, and meeting ordinary maintenance requirements for optical fiber lines. Faults of an optical fiber in a line of the WDM system, for example, optical fiber problems such as aging of the optical fiber, external damage of the optical fiber, optical fiber curling, large-angle bending, and bearing of a relatively large tensile force lead to service and communication degradation, a high bit error rate, and even service interruption. Therefore, a performance state of an optical fiber in a network may be discovered in time by monitoring the real-time performance state of the optical fiber by using the method provided in the embodiments of the present disclosure, and prevention in advance and in-time repair can be performed, thereby greatly improving network reliability.

DESCRIPTION OF EMBODIMENTS

Embodiments of the present disclosure provide an optical fiber status detection method, an optical supervisory unit, and a station, so as to resolve prior-art problems of relatively high costs and complex assembly caused by separately integrating an OTDR unit.

The method, the optical supervisory unit, and the station are based on a same inventive concept. Because principles for resolving problems by the method, the optical supervisory unit, and the station are similar, implementation of the apparatus and implementation of the method may refer to each other, and details of repetitions are not described herein again.

An optical wavelength division multiplexing transmission system is a main platform used for current trunk transmission and metropolitan area core network multiservice transmission, and a basic principle of the system is that a transmit end of an optical system multiplexes, by using a wavelength division multiplexer (multiplexer), optical carriers of input signals separately modulated in different wavelengths, and then transmits the multiplexed carriers to a remote end by using an optical fiber. A receive end of the optical system separates these optical carriers of different signals by using another wavelength division multiplexer (demultiplexer), and converts optical signals into corresponding electrical signals to complete long-haul transmission. Therefore, the Wavelength division multiplexing (WDM) system has advantages of great transmission capacity, easy expansion, and reliable transmission, and is highly ranked in a communications network.

Figure 1:
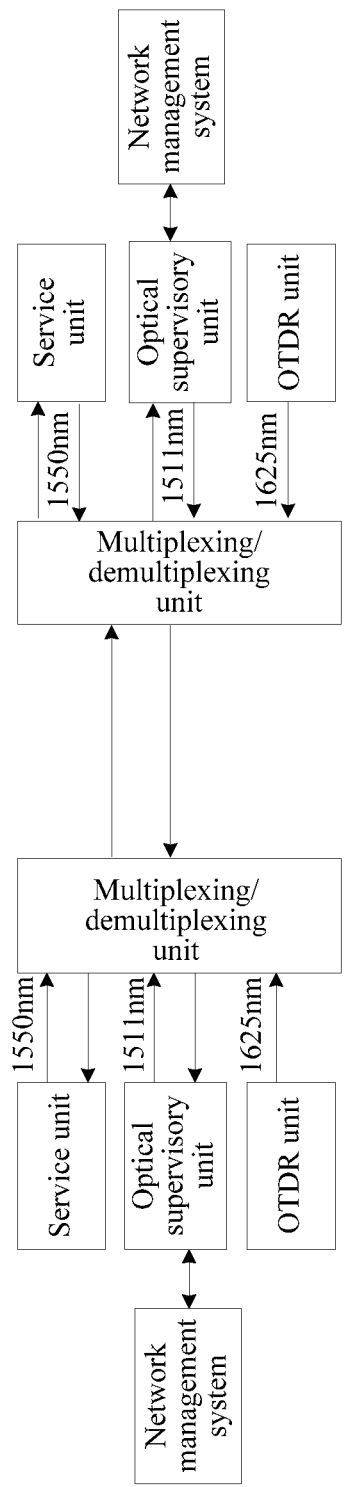
FIG. 1 is a schematic structural diagram of integrating an OTDR unit as an independent unit in a station according to the background of the present disclosure.
Figure 2:
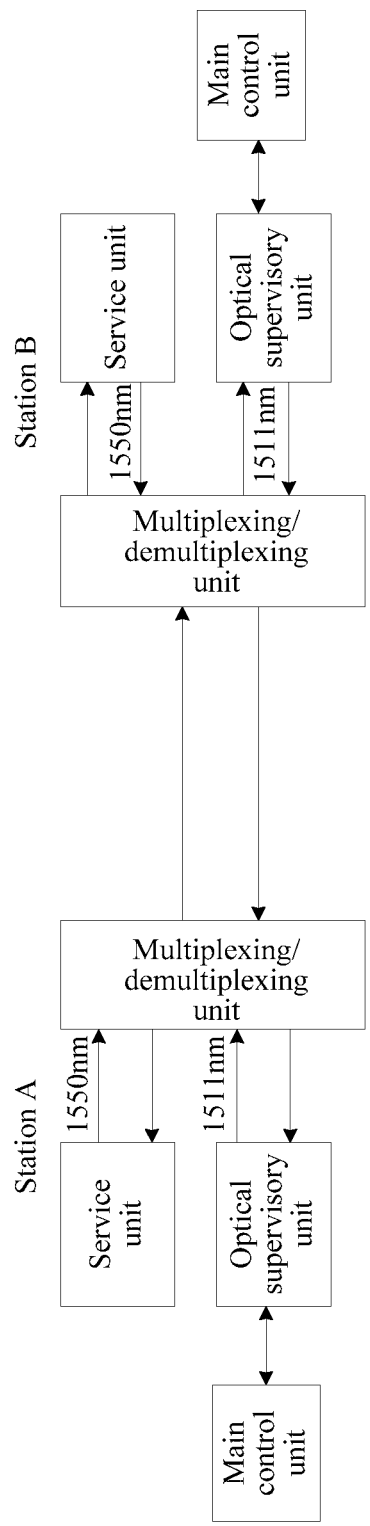
FIG. 2 is a schematic structural diagram of a WDM system according to an embodiment of the present disclosure.

Referring to FIG. 2, FIG. 2 is a schematic structural diagram of a basic point-to-point WDM system. Each station mainly includes a main control unit, a service unit, a multiplexing/demultiplexing unit, and an optical supervisory unit.

The main control unit is configured to receive a command from a network management system, execute or receive parameter configuration, deliver the parameter configuration to another unit, and report alarms in the station to the network management system. The service unit is configured to separately convert multiple electrical signals into corresponding optical signals of particular wavelengths and separately convert multiple optical signals of particular wavelengths into corresponding electrical signals. The multiplexing/demultiplexing unit is configured to convert multiple independent optical signals of particular wavelengths into multiplexed signals and convert the multiplexed signals into multiple independent optical signals of particular wavelengths. The optical supervisory unit is configured to implement communication between stations and complete management and control of the WDM system. For example, as shown in FIG. 2, the optical supervisory unit may transfer alarm information between the station A and the station B in real time and report the alarm information to the network management system by using the main control unit. In addition, the optical supervisory unit may also control parameter adjustment of an optical system according to an optical system parameter adjustment instruction delivered by the network management system.

Figure 3:
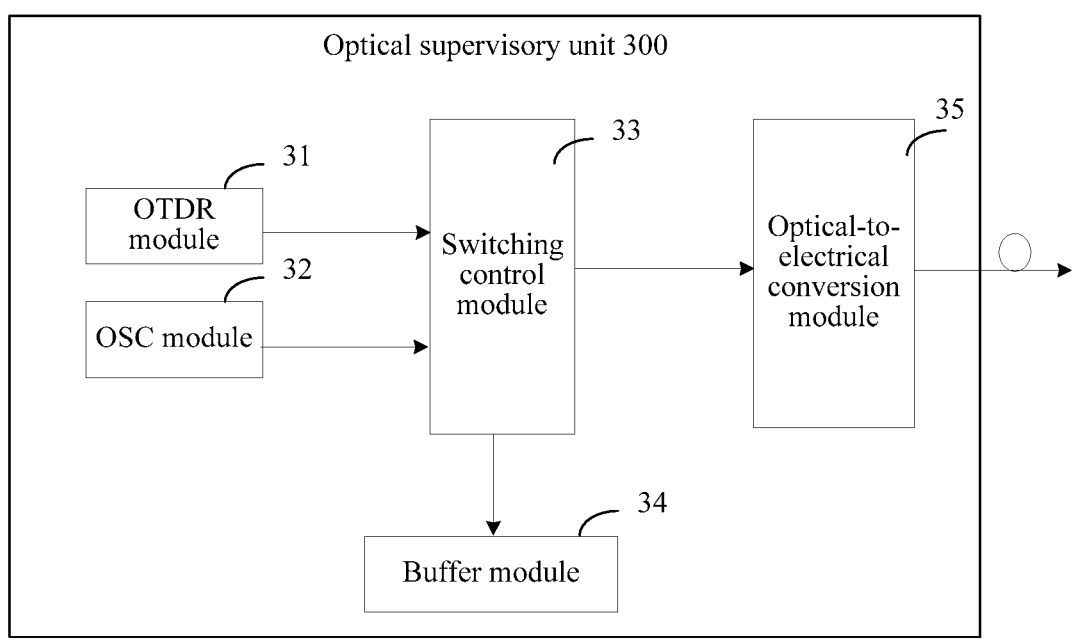
FIG. 3 is a schematic structural diagram of an optical supervisory unit according to an embodiment of the present disclosure.

Referring to FIG. 3, an embodiment of the present disclosure provides an optical supervisory unit 300, including at least: an OTDR module 31, an Optical Supervisory Channel (OSC) module 32, and a switching control module 33.

The OTDR module 31 is configured to send an OTDR pulse, and obtain an OTDR probe value according to received reflection light returned by the OTDR pulse by using an optical fiber between a first station and a second station; the optical supervisory unit 300 is located on the first station, and the second station is a neighboring station of the first station.

The OTDR pulse is an optical pulse for measuring a length of an optical fiber, propagation attenuation of the optical fiber, splice attenuation, and fault location.

Specifically, when sending the OTDR pulse, the OTDR module 31 may generate an OTDR probe pulse with an adjustable pulse width. When receiving the reflection light returned by the OTDR pulse by using the optical fiber between the first station and the second station, the OTDR module 31 may implement optical-to-electrical conversion on the reflection light, perform sampling analysis, obtain an OTDR probe value, and upload the obtained OTDR probe value to a main control unit in the first station. The main control unit further uploads the OTDR probe value to a network management system.

The OSC module 32 is configured to send first OSC data to the second station and receive second OSC data sent by the second station.

The OSC data refers to monitoring information, orderwire information, and alarm information of the network management system transmitted between stations.

Figure 11:
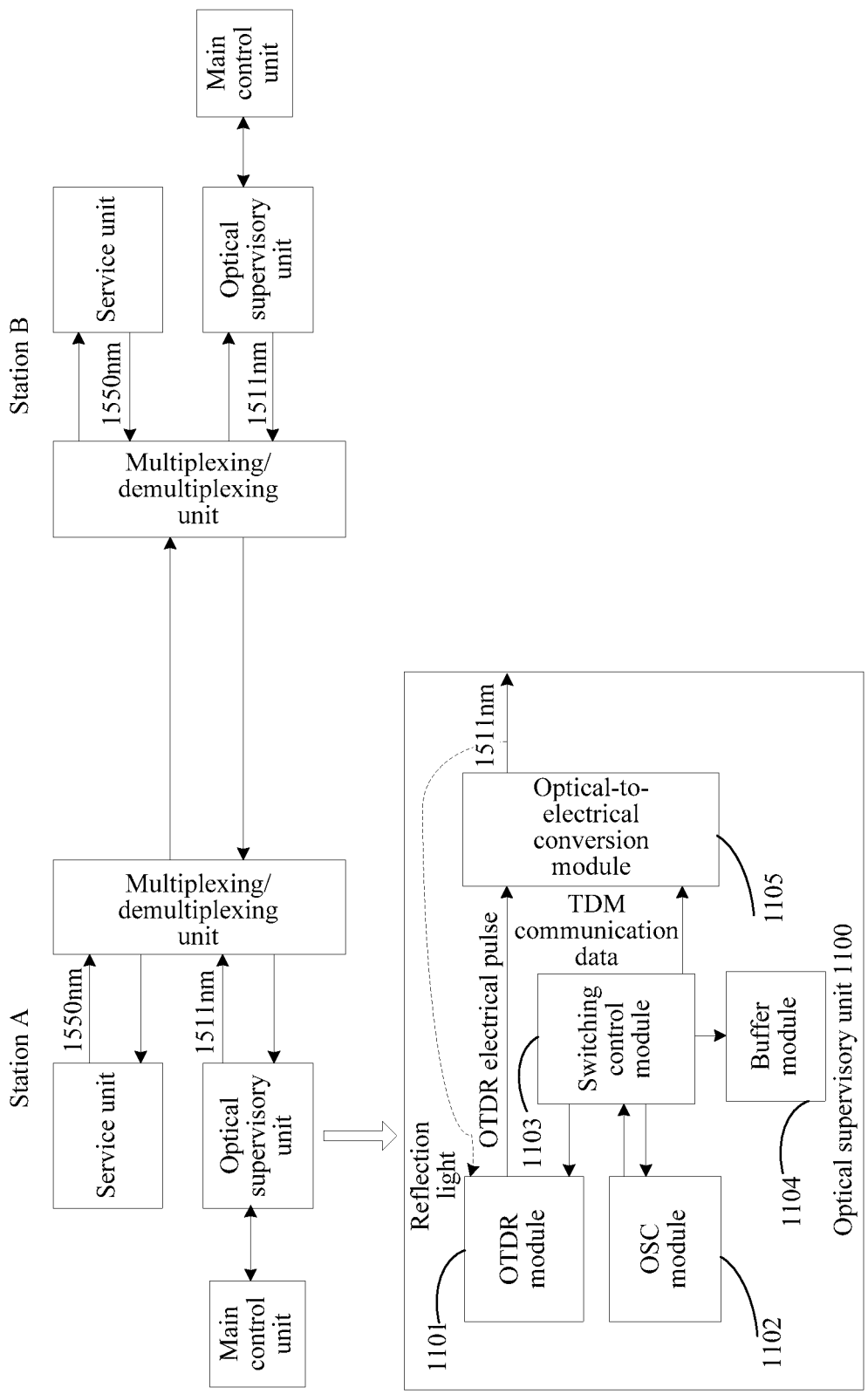
FIG. 11 is a schematic structural diagram of an optical supervisory unit using a TDM transmission manner according to an embodiment of the present disclosure.

Specifically, the OSC module 32 completes a conventional optical supervisory channel function. Referring to FIG. 11, when the OSC data is transmitted, a Time Division Multiplexing (TDM) transmission manner may be used. The switching control module 33 directly controls the OSC data. Alternatively, referring to FIG. 15, a transmission manner of packet communication is used, and the switching control module 33 and the main control unit jointly control the OSC data.

The switching control module 33 is configured to control the OTDR module 31 and the OSC module 32 to perform alternate sending of the OTDR pulse and the first OSC data, and forward the second OSC data sent by the second station to the OSC module 32.

Optionally, the optical supervisory unit 300 further includes a buffer module 34.

The buffer module 34 is configured to buffer OSC data generated when the OTDR module 30 sends the OTDR pulse.

Figure 15:
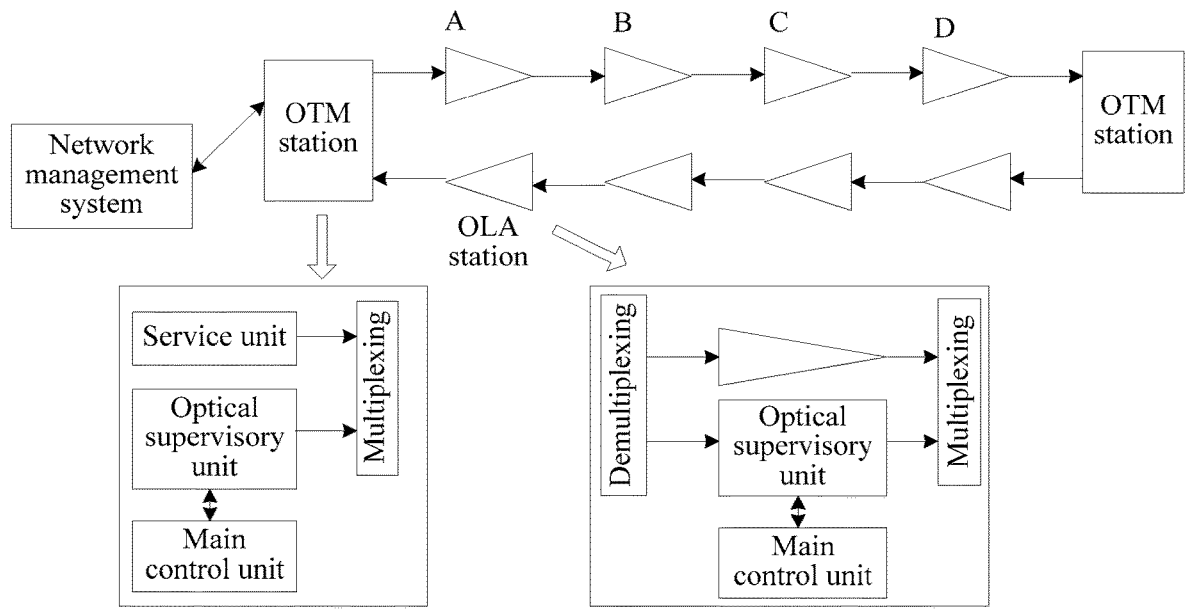
FIG. 15 is a schematic structural diagram of performing OTDR probe on multiple stations according to an embodiment of the present disclosure.

Referring to FIG. 11, when the optical supervisory unit 300 transmits the OSC data in a TDM transmission manner, the buffer module 34 is in the optical supervisory unit 300. Referring to FIG. 15, when the optical supervisory unit 300 transmits the OSC data in a transmission manner of packet communication, the buffer module 34 may be in the main control unit of the first station.

Optionally, the optical supervisory unit 300 further includes an optical-to-electrical conversion module 35.

The optical-to-electrical conversion module 35 is configured to convert the OTDR pulse to a corresponding optical signal, convert an electrical signal corresponding to the first OSC data to a corresponding optical signal, and convert a received optical signal corresponding to the second OSC data to a corresponding electrical signal.

An embodiment of the present disclosure further provides a station, including the optical supervisory unit shown in FIG. 3.

Figure 4:
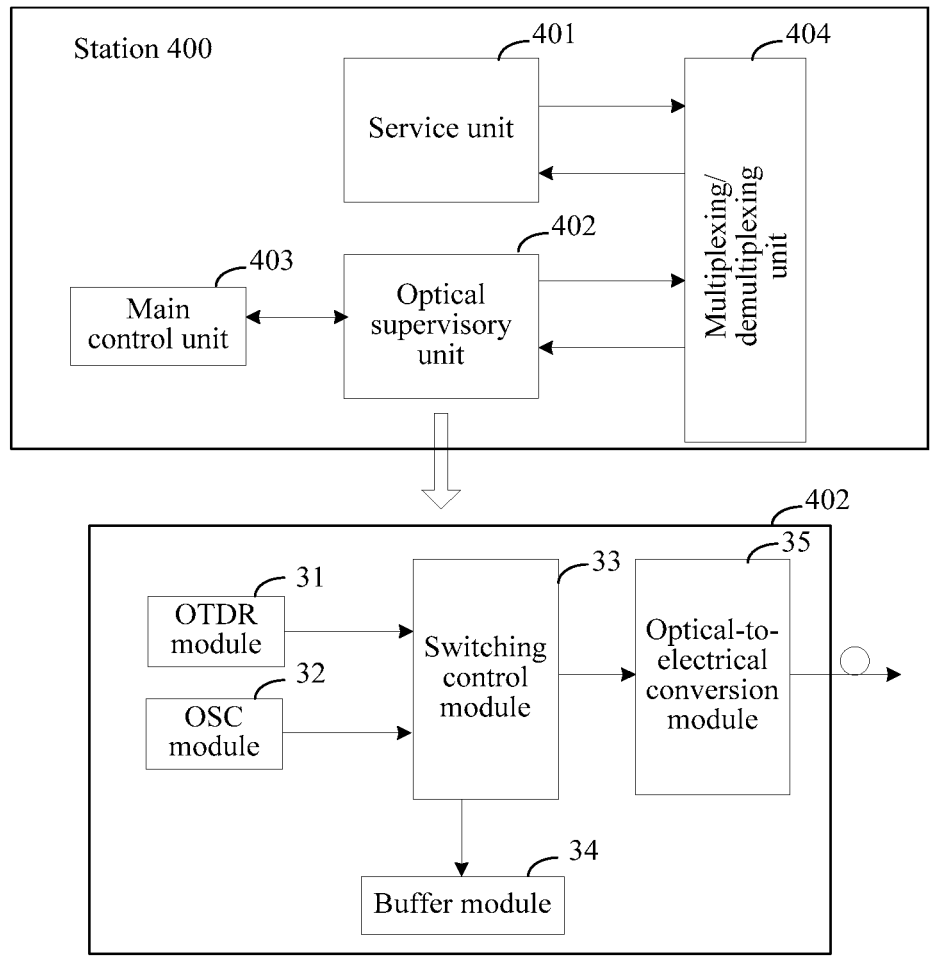
FIG. 4 is a schematic structural diagram of a station according to an embodiment of the present disclosure.

Referring to FIG. 4, the station 400 includes a service unit 401, an optical supervisory unit 402, a main control unit 403, and a multiplexing/demultiplexing unit 404, where a function of the optical supervisory unit 402 is the same as that of the optical supervisory unit shown in FIG. 3.

Figure 5:
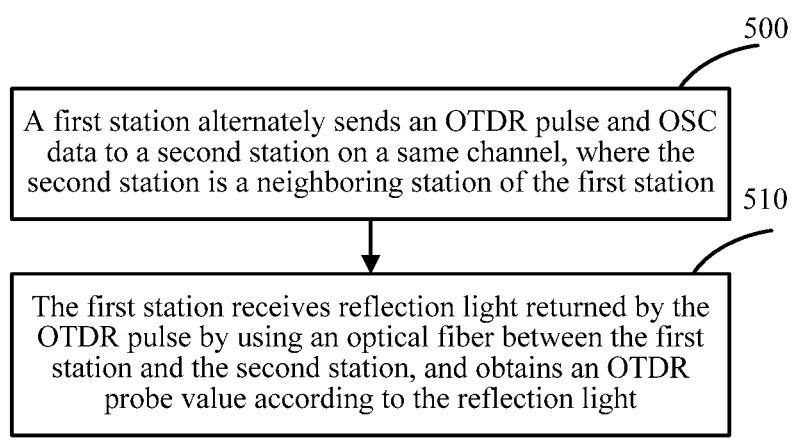
FIG. 5 is a general flowchart of an optical fiber status detection method according to an embodiment of the present disclosure.

Referring to FIG. 5, an embodiment of the present disclosure provides an optical fiber status detection method, including the following steps.

Step 500: A first station alternately sends an OTDR pulse and OSC data to a second station on a same channel, where the second station is a neighboring station of the first station.

The first station here is the station shown in FIG. 4.

Specifically, the same channel includes a transmission channel using a same wavelength, a same wavelength set, or a same protocol data frame.

Step 510: The first station receives reflection light returned by the OTDR pulse by using an optical fiber between the first station and the second station, and obtains an OTDR probe value according to the reflection light.

Optionally, before the first station alternately sends the OTDR pulse and the OSC data to the second station on the same channel, the first station receives an OTDR probe instruction delivered by a network management system. The OTDR probe instruction includes a quantity N of OTDR probe values that need to be obtained during this time of OTDR probe, and N is a positive integer.

Optionally, after the first station receives the OTDR probe instruction delivered by the network management system and before the first station alternately sends the OTDR pulse and the OSC data to the second station on the same channel, the first station determines, according to the quantity N of the OTDR probe values and a preset quantity n of OTDR pulses sent for a single time, that OTDR pulse sending needs to be performed for M times. That is, the OTDR pulses are sent in fragments.

For example, when the quantity of the OTDR probe values that need to be obtained is 10000 and the preset quantity of OTDR pulses sent for a single time is 100, a quantity of times of OTDR pulse sending that is needed for completing OTDR probe is 10000/100=100. If exact division cannot be performed, 1 plus a quotient obtained after N/n is used as M.

In this case, the first station may alternately send the OTDR pulse and the OSC data to the second station on the same channel in, but not limited to, the following two manners.

A first manner: in a wavelength division multiplexing system using TDM transmission, the first station may insert one time of OTDR pulse sending between any two adjacent OSC data frames until the M times of OTDR pulse sending are completed.

In the wavelength division multiplexing system using TDM transmission, N OTDR pulses are most preferably separately sent among multiple neighboring OSC data frames, because long time interruption of OSC data sending may cause problems that a network element is detached and the alarm information cannot be reported in time. Therefore, the N pulses need to be divided into many small fragments to be sent, so as to ensure no packet loss and no bit error in OSC data communication between the first station and the second station.

Further, the quantity n of OTDR pulses sent for a single time is mainly determined by a buffer size of a buffer module of the optical supervisory unit in the first station, a service bandwidth, and a time for sending a single OTDR pulse.

A service bandwidth A×a maximum quantity $n_{max}$ of OTDR pulses sent in a single time×a time T for sending a single OTDR pulse≤a buffer size S.

That is, $n_{max} \leq S/(A*T)$.

The first station may determine, according to $n_{max}$ obtained through calculation, a quantity n of OTDR pulses sent for a single time, and $n \leq n_{max}$.

In this case, each time the OTDR pulses are sent, the OSC data that should be sent when the OTDR pulses are sent further needs to be buffered.

Specifically, when the first station sends n OTDR pulses, because the current wavelength division multiplexing system uses a TDM transmission manner, a buffer module in a first optical supervisory unit of the first station buffers OSC data that should be sent during sending of the n OTDR pulses as first buffer data, and sends the first buffer data to the second station by using an OSC module in the first optical supervisory unit after sending of the n OTDR pulses is completed. Further, the buffer module in the first optical supervisory unit buffers the OSC data that should be sent during sending of the first buffer data as second buffer data, and sends the second buffer data by using the OSC module in the first optical supervisory unit after sending of the first buffer data is completed, and the rest can be deduced by analogy.

Generally, in a normal OSC data sending state, the optical supervisory unit does not occupy all egress bandwidths, reserves some redundancy bandwidths, and only occupies the redundancy bandwidth when the buffer module of the first optical supervisory unit has buffer data. Therefore, when sending the foregoing buffer data, the OSC module in the first optical supervisory unit uses a data area (that is, a service bandwidth) and a redundancy bandwidth that are shown in FIG. 5. After a period of time, the buffer module does not have buffer data and recovers to a normal OSC data sending state, that is, only the data area is occupied to send the OSC data.

Further, a sending time of the buffered OSC data generated due to sending of n OTDR pulses may also be determined.

Specifically, when the quantity n of OTDR pulses sent for a single time is determined, a time for sending OTDR pulses for a single time may be determined, that is, the time for sending OTDR pulses for a single time is equal to a sending time of each pulse multiplied by the quantity n of OTDR pulses sent for a single time. Further, the time for sending the buffered OSC data is determined according to the time for sending OTDR pulses and according to egress bandwidth information.

The egress bandwidth information may be a ratio of the redundancy bandwidth to the service bandwidth, the redundancy bandwidth and the service bandwidth, or the like.

For example, if the service bandwidth is W and the redundancy bandwidth is 0.2×W, when the time for sending OTDR pulses is T, the sending time of the buffered OSC data generated due to sending of OTDR pulses is T/0.2=5×T, that is, after 5T, the buffer module in the first optical supervisory unit does not have buffer data, and recovers to a normal OSC data sending state. In this case, a next time of OTDR pulse sending may be instantly initiated, or after several normal OSC data frames are sent, a next time of OTDR pulse sending is performed. Here, the switching control module in the first optical supervisory unit may control an occasion of the next time of OTDR pulse sending, or a rule of alternately sending the OTDR pulse and the OSC data is preset in the switching control module.

Figure 6:
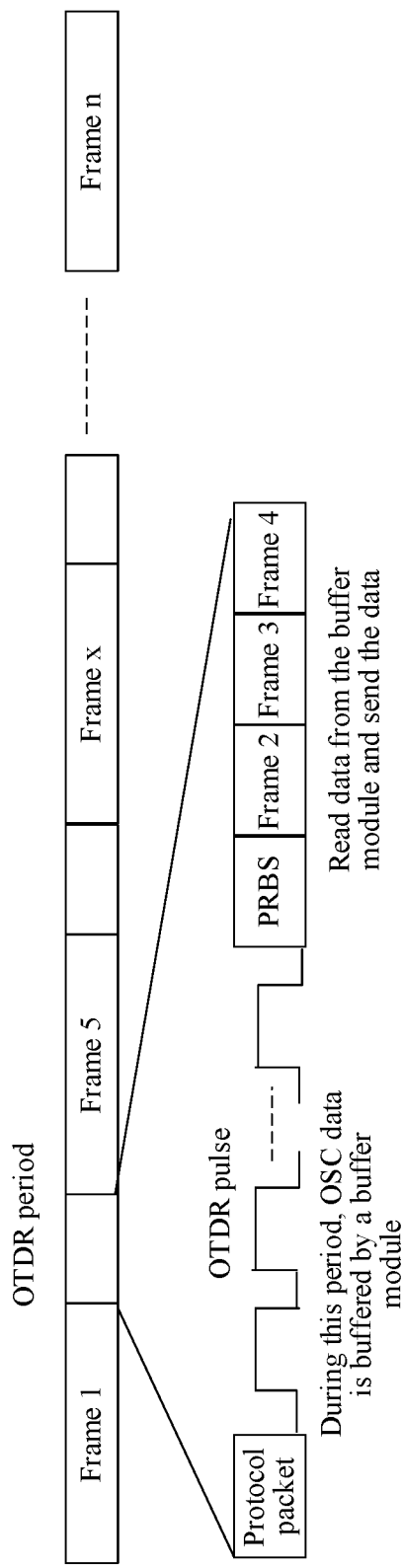
FIG. 6 is a schematic structural diagram of an OTDR period according to an embodiment of the present disclosure.

For example, referring to FIG. 6, a process of alternately sending n OTDR pulses and sending OSC buffered data each time is used as an OTDR period, and the period may alternate in normal OSC data frame sending. Each OTDR period includes sending an OTDR probe start instruction (that is, a protocol packet shown in FIG. 6), sending n OTDR pulses, sending a preset physical layer recovery message (that is, a pseudorandom bit sequence (Pseudorandom Bit Sequence, PRBS) shown in FIG. 6), and sending OSC buffered data (that is, a frame 2, a frame 3, and a frame 4 that are shown in FIG. 6) to a downstream station. In this case, the frame 2, the frame 3, and the frame 4 may be used to send the OSC buffered data.

Figure 7:
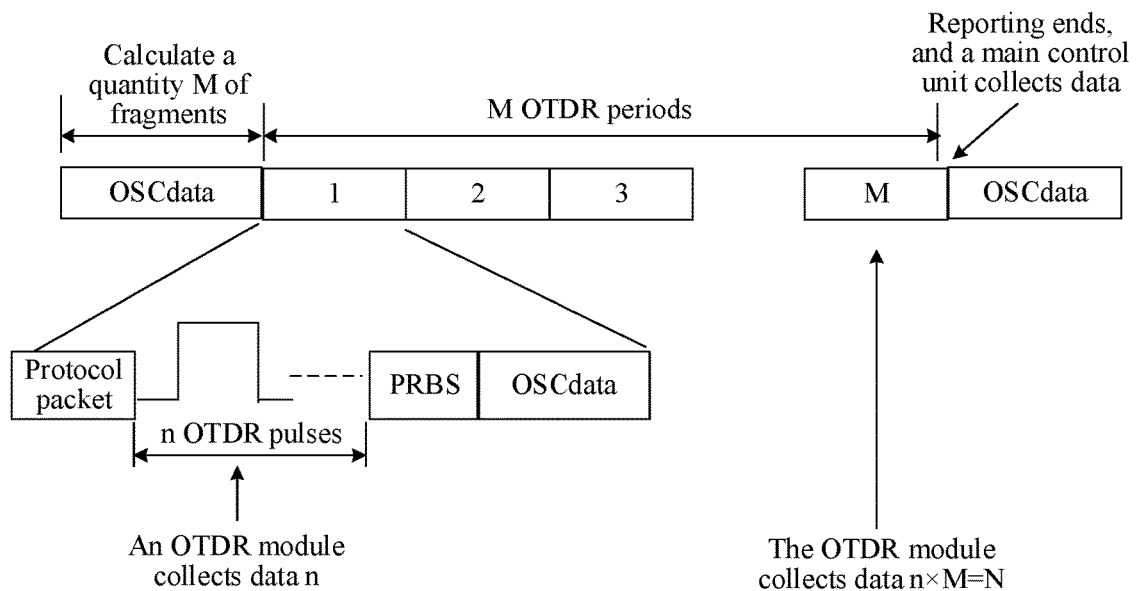
FIG. 7 is a schematic structural diagram of continuous sending of M OTDR periods according to an embodiment of the present disclosure.

For another example, referring to FIG. 7, sending may be performed continuously for M OTDR periods to obtain N OTDR probe values that are required to complete the current OTDR probe.

A second manner: in a wavelength division multiplexing system using data packet transmission, the first station may insert at least one time of OTDR pulse sending between any two adjacent OSC data packets until the M times of OTDR pulse sending are completed.

The following several possible implementation manners are specifically included.

A first possible implementation manner: the first station may send OTDR pulses (that is, N pulses) for M times between any two adjacent OSC data packets, that is, sending, between any two adjacent OSC data packets in a centralized manner, the N pulses that need to be sent.

Figure 8:
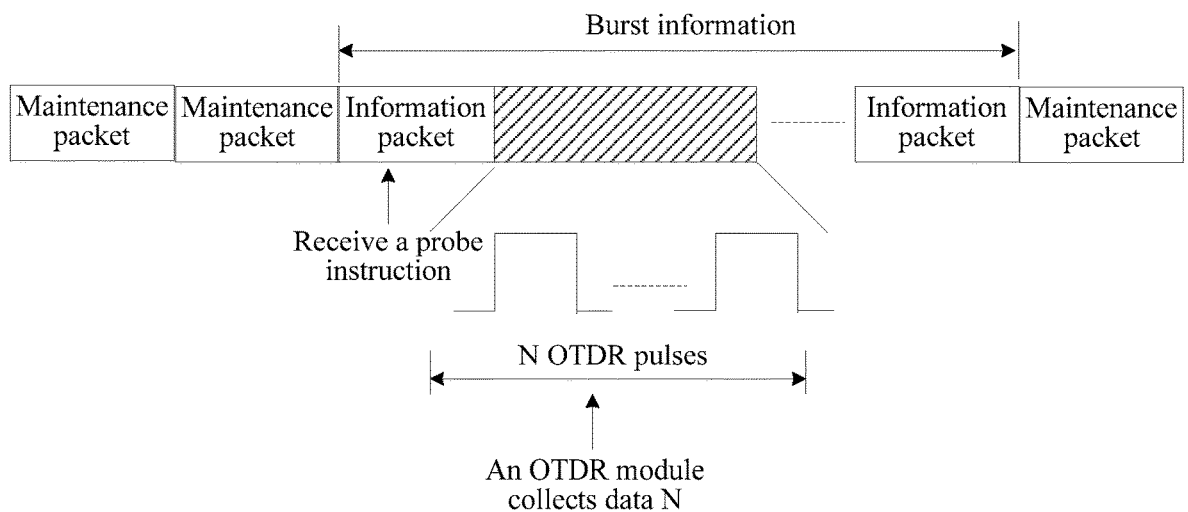
FIG. 8 is a schematic structural diagram of sending an OTDR pulse in a centralized manner according to an embodiment of the present disclosure.

A current link state may be an idle state, or an occupied state of sending the OSC data packet. Referring to FIG. 8, N OTDR pulses may be directly sent in a centralized manner after a data packet is sent. In this case, a packet loss problem may not be caused because of data sending interruption. However, if the OTDR pulses are alternately sent in intervals of the OSC data packets, a buffer module needs to be disposed to buffer the OSC data packets that should be sent when the OTDR pulses are sent. The buffered OSC data packets are sent to a second station after the OTDR pulse sending is completed. In this case, capacity of the buffer module needs to be greater than a magnitude of the buffered OSC data packet generated by sending M times of the OTDR pulses, and is generally set according to an empirical value.

A second possible implementation manner: when determining that a current link is idle, the first station inserts at least one time of OTDR pulse sending during an interval of sending a maintenance packet, until the M times of OTDR pulse sending are completed.

Herein, a same quantity of times of OTDR pulse sending may be inserted, or a different quantity of times of OTDR pulse sending may be inserted, and this is controlled by the first station.

Figure 9:
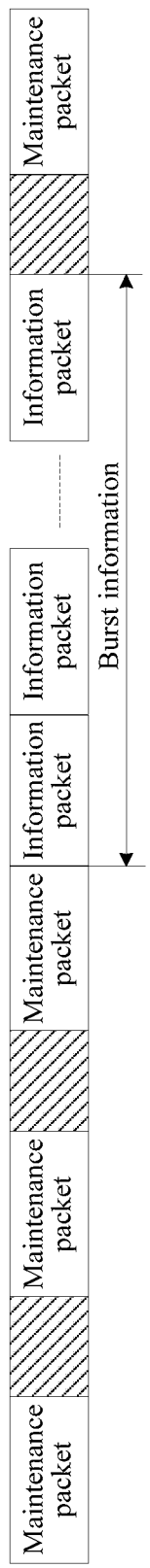
FIG. 9 is a schematic structural diagram of inserting, in an interval for sending a maintenance packet, sending of an OTDR pulse according to an embodiment of the present disclosure.

Referring to FIG. 9, when the link is idle, the first station sends a maintenance packet to the second station. The n OTDR pulses may be inserted in a sending interval of each maintenance packet until M times of OTDR pulse sending are completed.

A third possible implementation manner: when determining that an OSC data packet is being sent on a current link, the first station inserts at least one time of OTDR pulse sending during an interval of sending the OSC data packet, until the M times of OTDR pulse sending are completed.

Herein, a same quantity of times of OTDR pulse sending may be inserted, or a different quantity of times of OTDR pulse sending may be inserted, and this is controlled by the first station.

In this case, the OSC data packets that should be sent when the OTDR pulses are sent need to be buffered.

Figure 10:
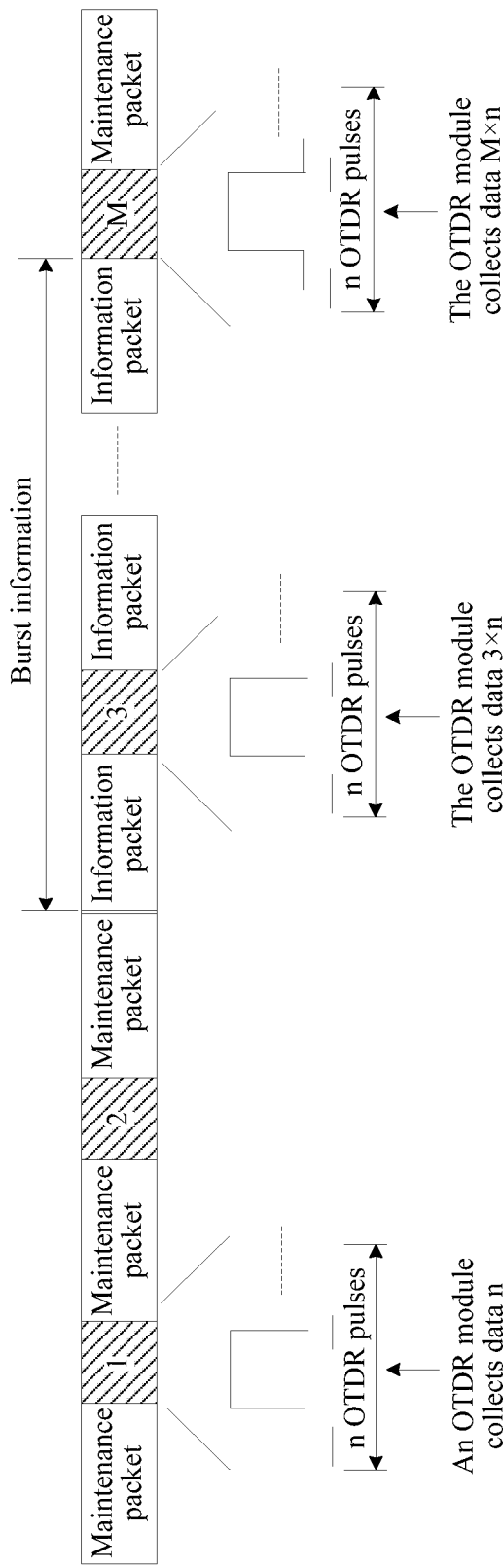
FIG. 10 is a schematic structural diagram of separately inserting one time of OTDR pulse sending in an interval for sending a maintenance packet and an information packet according to an embodiment of the present disclosure.

Specifically, referring to FIG. 10, n OTDR pulses are separately inserted in intervals for sending maintenance packets and information packets, until the M times of OTDR pulse sending are completed.

Optionally, after the first station determines that the OTDR pulse sending needs to be performed for M times and before the first station alternately sends the OSC data and the OTDR pulse to the second station on the same channel, the first station may send an OTDR probe start instruction to the second station, and the OTDR probe start instruction is used to instruct the second station to switch from a receiving state of receiving the OSC data to a silent state of waiting for OTDR probe.

Optionally, after the first station sends the OTDR pulse to the second station and before the first station sends the OSC data to the second station (that is, during any alternate sending performed by the first station, after sending of the OTDR pulse is completed and before the OSC data continues to be sent), the first station may send a preset physical layer recovery message to the second station, for example, sending a PRBS, and the preset physical layer recovery message is used to instruct the second station to switch from the silent state of waiting for OTDR probe to the receiving state of receiving the OSC data. When determining that a preset physical layer recovery acknowledgment message fed back by the second station is received, the first station sends the OSC data to the second station.

Optionally, after the first station sends the preset physical layer recovery message to the second station, when determining that a preset physical layer recovery acknowledgment message fed back by the second station is not received during preset duration, the first station sends the OSC data to the second station.

Referring to FIG. 11, an optical supervisory unit 1100 transmits OSC data in a TDM transmission manner, and the optical supervisory unit 1100 may include an OTDR module 1101, an OSC module 1102, and a switching control module 1103.

The OTDR module 1101 is configured to send an OTDR pulse, and obtain an OTDR probe value according to received reflection light returned by the OTDR pulse by using an optical fiber between a first station and a second station; the optical supervisory unit 1100 is located on the first station, and the second station is a neighboring station of the first station.

The OSC module 1102 is configured to send first OSC data to the second station and receive second OSC data sent by the second station.

Specifically, when the optical supervisory unit 1100 transmits the OSC data in the TDM transmission manner, the OSC module 1102 is used as a communications pipe for bearing control and monitoring information of a network management system for stations, and reported information of alarm states of the stations.

Figure 12:
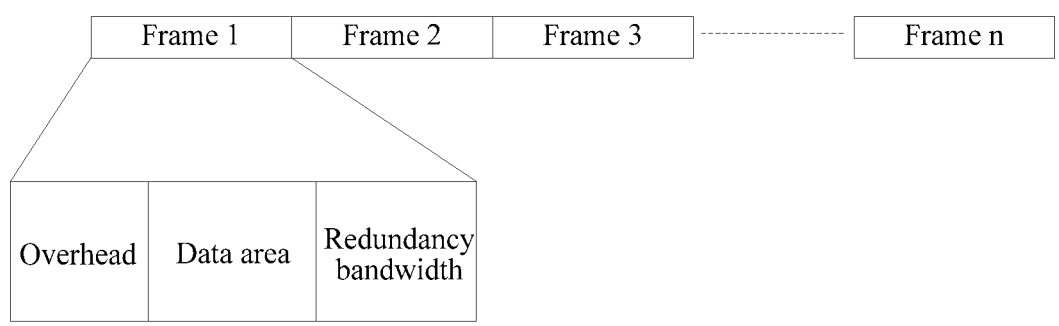
FIG. 12 is a schematic structural diagram of an OSC data frame according to an embodiment of the present disclosure.

Referring to FIG. 12, the communications pipe is a data frame with a rate of 155.52 Mbps. To support coexistence of the OSC data and the OTDR probe on a line, some redundancy bandwidths are reserved in a frame structure design, so that the some redundancy bandwidths can be occupied when the OSC buffered data is sent, so as to send the OSC buffered data as soon as possible; that is, a normal data frame sends the OSC data by using a data area (that is, a service bandwidth), and the service bandwidth and the redundancy bandwidth are used to send the OSC buffered data.

The switching control module 1103 is configured to directly control the OTDR module 1101 and the OSC module 1102 to perform alternate sending of the OTDR pulse and the first OSC data, and forward the second OSC data sent by the second station to the OSC module 1102.

A buffer module 1104 is configured to buffer OSC data generated when the OTDR module sends the OTDR pulse.

The optical-to-electrical conversion module 1105 is configured to convert the OTDR pulse to a corresponding optical signal, convert an electrical signal corresponding to the first OSC data to a corresponding optical signal, and convert a received optical signal corresponding to the second OSC data to a corresponding electrical signal.

Figure 13:
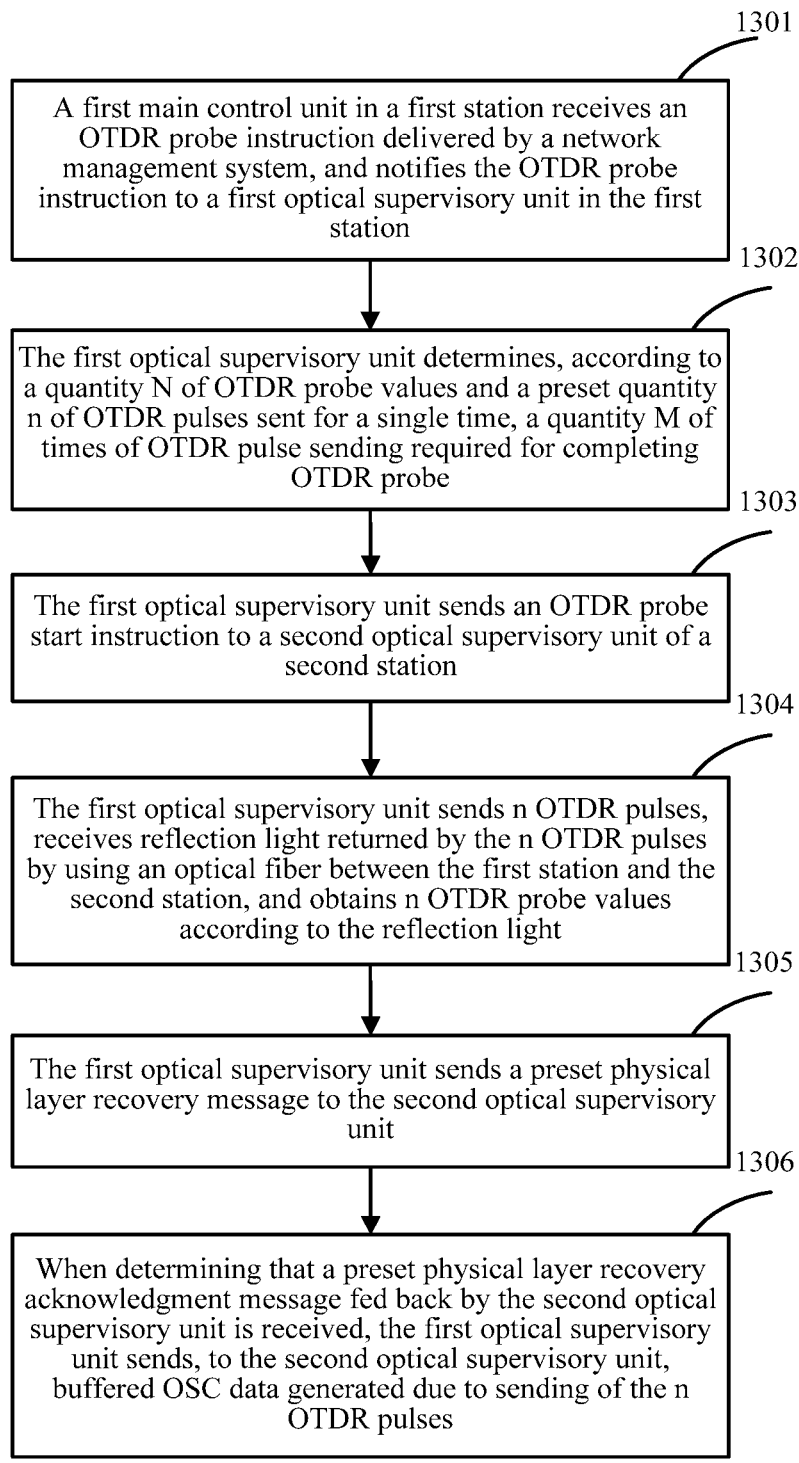
FIG. 13 is a specific flowchart of sending in an OTDR period according to an embodiment of the present disclosure.

Referring to FIG. 13, for a wavelength division multiplexing system using TDM transmission, the following specifically describes an optical fiber status detection process shown in FIG. 6, that is, a process of sending in an OTDR period specifically includes the following steps.

Step 1301: A first main control unit in a first station receives an OTDR probe instruction delivered by a network management system, and notifies the OTDR probe instruction to a first optical supervisory unit in the first station.

The first station here includes the optical supervisory unit shown in FIG. 11.

The OTDR probe instruction includes a quantity N of OTDR probe values that need to be obtained during this time of OTDR probe, and N is a positive integer.

Step 1302: The first optical supervisory unit determines, according to a quantity N of OTDR probe values and a preset quantity n of OTDR pulses sent for a single time, a quantity M of times of OTDR pulse sending required for completing OTDR probe, where n is a preset positive integer.

Specifically, referring to FIG. 11, the switching control module 1103 presets the quantity n of OTDR pulses sent for a single time, and further determines, according to the quantity N of OTDR probe values, the quantity M of times of OTDR pulse sending required for completing the OTDR probe.

Step 1303: The first optical supervisory unit sends an OTDR probe start instruction to a second optical supervisory unit of a second station.

The OTDR probe start instruction is used to instruct the second station to switch from a receiving state of receiving OSC data to a silent state of waiting for OTDR probe, referring to the protocol packet in FIG. 6.

Figure 14A:
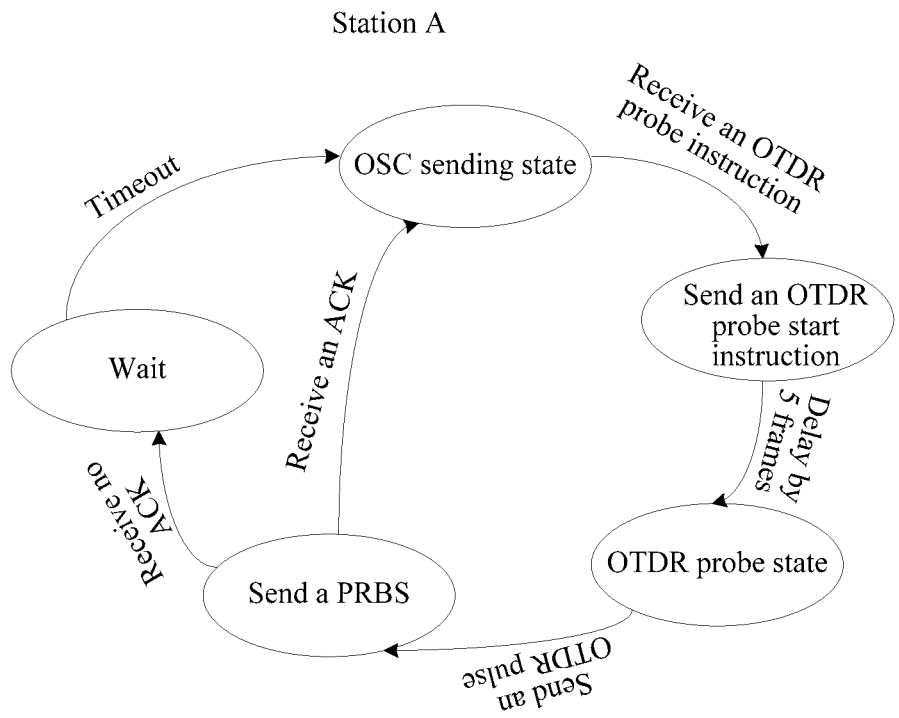
FIG. 14A is a schematic diagram of a status change of a station A according to an embodiment of the present disclosure.

As shown in FIG. 14A, the OTDR probe start instruction may be continuously sent for multiple times. Generally, a station A sends the OTDR probe start instruction to a downstream station, that is, a station B, by using an overhead byte in a normal frame. For example, the OTDR pulse starts to be sent after 5 frames are continuously sent, and the station A enters an OTDR probe state.

Figure 14B:
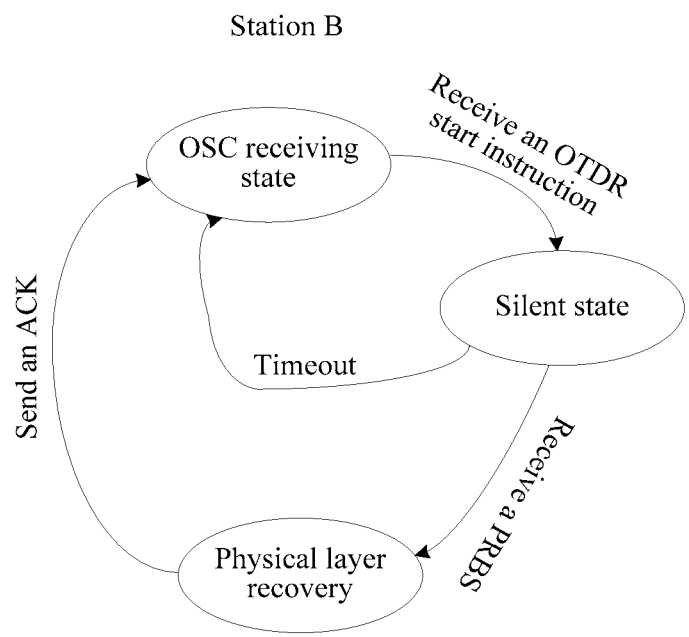
FIG. 14B is a schematic diagram of a status change of a station B according to an embodiment of the present disclosure.

As shown in FIG. 14B, the downstream station, that is, station B needs to keep synchronized with the upstream station, that is, station A. After continuously receiving 5 OTDR probe start instructions, the downstream station, that is, station B starts to latch downstream data. If the OSC data currently received by the downstream station, that is, station B is incomplete, the incomplete OSC data is latched, that is, the currently received OSC data that cannot compose a complete data packet is sent to a main control unit of the station B, so as to ensure hitless switch between the OSC data and the OTDR pulse. After completing the latching operation, the downstream station, that is, station B enters the silent state of waiting for OTDR probe.

Step 1304: The first optical supervisory unit sends n OTDR pulses, receives reflection light returned by the n OTDR pulses by using an optical fiber between the first station and the second station, and obtains n OTDR probe values according to the reflection light.

Specifically, as shown in FIG. 11, the optical supervisory unit includes an OTDR module 1101, and the OTDR module may generate an OTDR pulse with an adjustable pulse width. The OTDR pulse sent by the OTDR module is sent to the optical fiber between the first station and the second station by using an optical-to-electrical conversion module, and the OTDR module obtains an OTDR probe value according to reflection light returned by the received OTDR pulse by using the optical fiber between the first station and the second station.

In an actual application process, because a distance between two stations is relatively long, generally, single-fiber bidirectional OTDR probe may be synchronously started so as to implement complete probe on an entire optical fiber between the two stations.

Step 1305: The first optical supervisory unit sends a preset physical layer recovery message to the second optical supervisory unit.

The preset physical layer recovery message is used to instruct the second station to switch from the silent state of waiting for OTDR probe to the receiving state of receiving the OSC data, referring to a PRBS in FIG. 6.

Step 1306: When determining that a preset physical layer recovery acknowledgment message fed back by the second optical supervisory unit is received, the first optical supervisory unit sends, to the second optical supervisory unit, buffered OSC data generated due to sending of the n OTDR pulses.

The sent OSC buffered data is read from the buffer module in the optical supervisory unit. Referring to the frame 2, the frame 3, and the frame 4 in FIG. 6, the frame 2, the frame 3, and the frame 4 are used to send the read OSC buffered data.

As shown in FIG. 14A and FIG. 14B, after the optical supervisory unit in the station A sends n OTDR pulses each time, before sending, to the second optical supervisory unit, the buffered OSC data generated due to sending of n OTDR pulses, the optical supervisory unit in the station A sends the preset physical layer recovery message to the optical supervisory unit in the station B, for example, sending the PRBS. In this case, the preset physical layer recovery message needs to be set to an invalid frame.

When determining that the preset physical layer recovery acknowledgment message, such as an ACK, fed back by the second optical supervisory unit is received, the optical supervisory unit in the station A sends, to the optical supervisory unit in the station B, the buffered OSC data generated due to sending of n OTDR pulses, and recovers to an OSC data sending state.

Optionally, to ensure system reliability and avoid that an optical fiber has a fault such as fiber cutting or optical fiber abnormality, and cannot recover to the receiving state in time to perform fault alarming during sending of the OTDR pulse, timers are disposed on both the first optical supervisory unit and the second optical supervisory unit. If the preset physical layer recovery acknowledgment message fed back by the second optical supervisory unit is not received during first preset duration, the first optical supervisory unit sends, to the second optical supervisory unit, the buffered OSC data generated due to sending of n OTDR pulses. If the preset physical layer recovery message is not received during second preset duration after receiving the OTDR probe start instruction, the second optical supervisory unit recovers to an OSC receiving state.

Further, after completing the M times of OTDR pulse sending, the first optical supervisory unit feeds back the obtained N OTDR probe values to a network management system by using a main control unit.

In an actual application process, as shown in FIG. 15, a network management system may probe stations segment by segment, for example, probe an Optical Terminal Multiplexer (OTM) station-A-B-C-D-OTM station segment by segment, or probe multiple stations in parallel, for example, probe an OTM station-A-B-C-D-OTM station in parallel.

Figure 16:
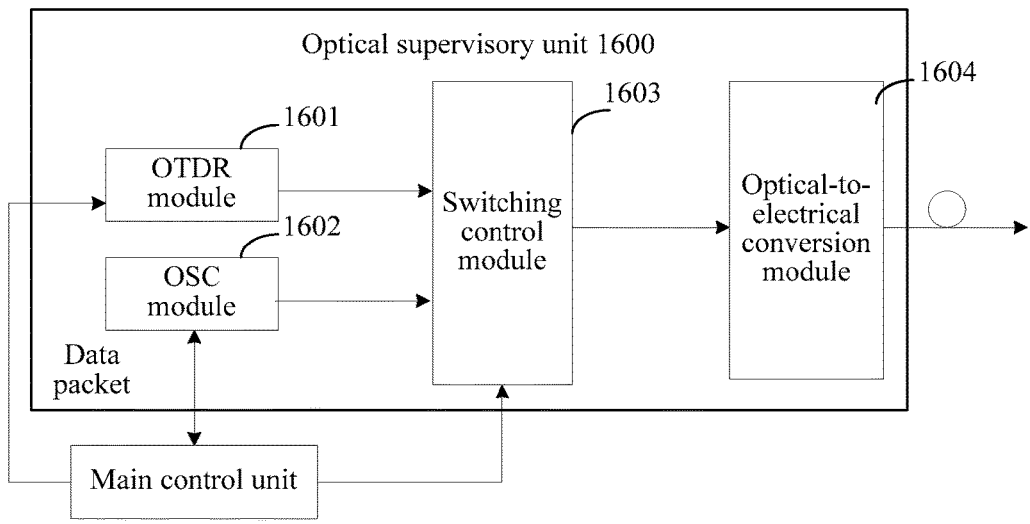
FIG. 16 is a schematic structural diagram of an optical supervisory unit using a data packet transmission manner according to an embodiment of the present disclosure.

As shown in FIG. 16, an optical supervisory unit 1600 transmits OSC data in a packet communication manner and includes at least: an OTDR module 1601, an OSC module 1602, a switching control module 1603, and an optical-to-electrical conversion module 1604.

The OTDR module 1601 is configured to send an OTDR pulse, and obtain an OTDR probe value according to received reflection light returned by the OTDR pulse by using an optical fiber between a first station and a second station; the optical supervisory unit 1600 is located on the first station, and the second station is a neighboring station of the first station.

The OSC module 1602 is configured to send first OSC data to the second station and receive second OSC data sent by the second station.

The switching control module 1603 is configured to receive a control command of a main control unit, control the OTDR module 1601 and the OSC module 1602 to perform alternate sending of the OTDR pulse and the first OSC data, and forward the second OSC data sent by the second station to the OSC module 1602.

The optical-to-electrical conversion module 1604 is configured to convert the OTDR pulse to a corresponding optical signal, convert an electrical signal corresponding to the first OSC data to a corresponding optical signal, and convert a received optical signal corresponding to the second OSC data to a corresponding electrical signal.

In a wavelength division multiplexing system using data packet transmission, the main control unit controls modules of the optical supervisory unit in a centralized manner, and a buffer module may be configured in the main control unit to buffer OSC data packets that need to be sent when the OTDR pulse is sent.

Figure 17:
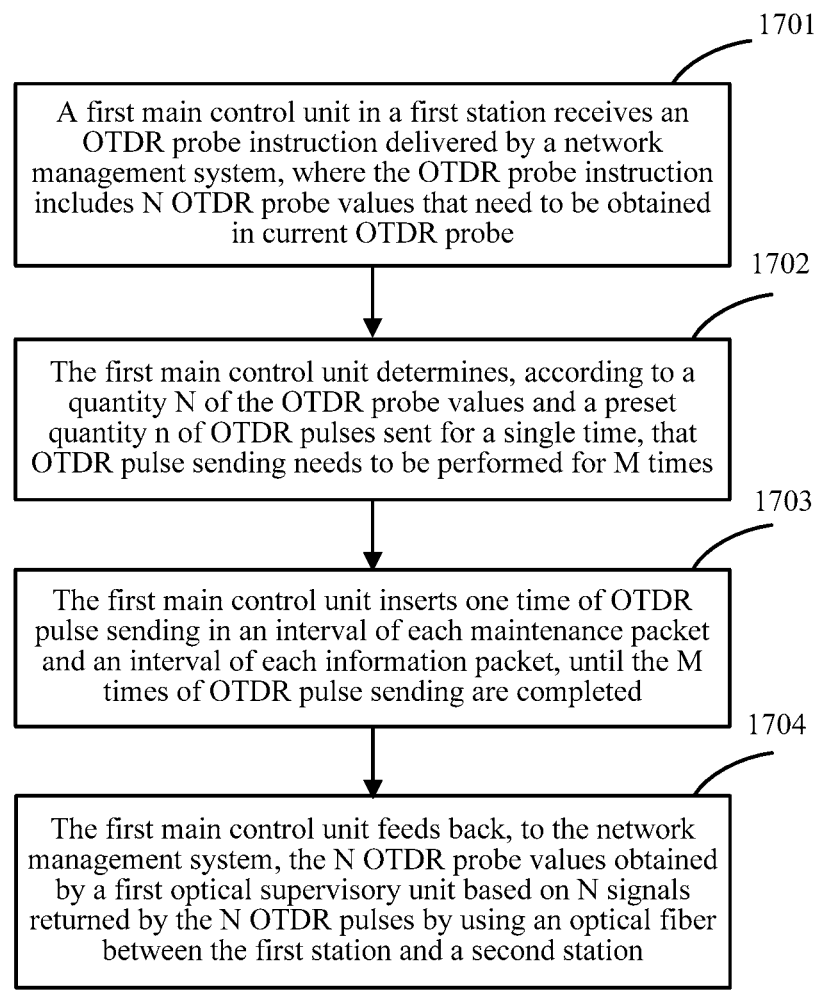
FIG. 17 is a specific flowchart of optical fiber status detection in a wavelength division multiplexing system using a data packet transmission manner according to an embodiment of the present disclosure.

As shown in FIG. 17, for a wavelength division multiplexing system using data packet transmission, the following specifically describes an optical fiber status detection process in FIG. 10, and the process specifically includes the following steps.

Step 1701: A first main control unit in a first station receives an OTDR probe instruction delivered by a network management system, where the OTDR probe instruction includes N OTDR probe values that need to be obtained in current OTDR probe, and N is a positive integer.

Step 1702: The first main control unit determines, according to a quantity N of the OTDR probe values and a preset quantity n of OTDR pulses sent for a single time, that OTDR pulse sending needs to be performed for M times.

Step 1703: The first main control unit inserts one time of OTDR pulse sending in an interval of each maintenance packet and an interval of each information packet, until the M times of OTDR pulse sending are completed.

The maintenance packet and the information packet here are both OSC data packets. Generally, the maintenance packet is an OSC data packet used to maintain communication between stations, and the information packet is an OSC data packet including alarm information.

In a process of sending an OTDR pulse each time, a main control unit first sends, to a switching control module, an instruction for starting an OTDR module to send the OTDR pulse to enable the switching control module to establish a connection relationship with the OTDR module, and then sends, to the OTDR module, the instruction for sending an OTDR pulse, to instruct the OTDR module to send the OTDR pulse. In a process of sending an OSC data packet each time, the main control unit first sends, to the switching control module, an instruction for starting an OSC module to send the OSC data to enable the switching control module to establish a connection relationship with the OSC module, and then sends, to the OSC module, the instruction for sending OSC data, and the main control unit sends OSC data packets to the OSC module, to instruct the OTDR module to send these OSC data packets.

In the foregoing process of sending an OTDR pulse, if there is OSC data that needs to be sent, in this case, the main control unit needs to have a particular cache to first buffer the OSC data, and after completing sending the current OTDR pulse, sends the buffered OSC data packet.

Step 1704: The first main control unit feeds back, to the network management system, the N OTDR probe values obtained by a first optical supervisory unit based on N signals returned by N OTDR pulses by using an optical fiber between the first station and a second station.

In conclusion, the embodiments of the present disclosure resolve problems of relatively high costs and complex assembly caused by separately integrating an OTDR unit in a WDM system, and meanwhile, may meet ordinary maintenance requirements for optical fiber lines.

Faults of an optical fiber in a line of the WDM system, for example, optical fiber problems such as aging of the optical fiber, external damage of the optical fiber, optical fiber curling, large-angle bending, and bearing of a relatively large tensile force lead to service and communication degradation, a high bit error rate, and even service interruption. Therefore, a performance state of an optical fiber in a network may be discovered in time by monitoring the real-time performance state of the optical fiber by using the method provided in the embodiments of the present disclosure, and prevention in advance and in-time repair can be performed, thereby greatly improving network reliability.

It should be noted that division of modules in the embodiments of the present disclosure is exemplary, and is merely logical function division and may be other division in actual implementation. In addition, the functional modules in the embodiments of this application may be integrated into one processing module, or each of the modules may exist alone physically, or two or more modules may be integrated into one module. The integrated module may be implemented in a form of hardware, or may be implemented in a form of a software functional module.

When the integrated module is implemented in the form of a software functional module and sold or used as an independent product, the integrated unit may be stored in a computer-readable storage medium. Based on such an understanding, the technical solutions of the present application essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor (processor) to perform all or a part of the steps of the methods in the embodiments of the present application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present disclosure have been described, persons skilled in the art can make changes and modifications to these embodiments once they learn the basic inventive concept. Therefore, the following claims are intended to be construed as to cover the preferred embodiments and all changes and modifications falling within the scope of the present disclosure.

Obviously, persons skilled in the art can make various modifications and variations to the embodiments of the present disclosure without departing from the spirit and scope of the embodiments of the present disclosure. The present disclosure is intended to cover these modifications and variations provided that they fall within the scope of protection defined by the following claims and their equivalent technologies.

What is claimed is:

1. An optical fiber status detection method, comprising:
   receiving, by a first station, an optical time domain reflectometer (OTDR) probe instruction delivered by a network management system;
   in response to receiving the OTDR probe instruction from the network management system, alternately sending, by the first station, an OTDR pulse and optical supervisory channel (OSC) data to a second station on a same channel, wherein a pattern of alternately sending the OTDR pulse and the OSC data is based on the OTDR probe instruction, wherein the second station is a neighboring station of the first station, and wherein the first station is an Optical Terminal Multiplexer (OTM) station;
   receiving, by the first station, reflection light returned by the OTDR pulse by using an optical fiber between the first station and the second station; and
   obtaining, by the first station, an OTDR probe value according to the reflection light.

2. The method according to claim 1,
   wherein the OTDR probe instruction comprises a quantity N of OTDR probe values that are to be obtained during an OTDR probe, and wherein N is a positive integer.

3. The method according to claim 2, further comprising:
after the receiving, by the first station, the OTDR probe instruction delivered by the network management system and before the alternately sending, by the first station, the OTDR pulse and the OSC data to the second station on the same channel:
  determining, by the first station according to the quantity N of OTDR probe values and a preset quantity n of OTDR pulses sent for a single time, that OTDR pulse sending is to be performed for M times;
wherein the alternately sending, by the first station, the OTDR pulse and the OSC data to the second station on the same channel comprises one of:
  inserting, by the first station, one time of OTDR pulse sending between two adjacent OSC data frames until the M times of OTDR pulse sending are completed in a wavelength division multiplexing system using time division multiplexing (TDM) transmission; or
  inserting, by the first station, at least one time of OTDR pulse sending between two adjacent OSC data packets until the M times of OTDR pulse sending are completed in a wavelength division multiplexing system using data packet transmission.

4. The method according to claim 3, further comprising:
after the determining, by the first station, that the OTDR pulse sending is to be performed for M times and before the alternately sending, by the first station, the OTDR pulse and the OSC data to the second station on the same channel:
  sending, by the first station, an OTDR probe start instruction to the second station, wherein the OTDR probe start instruction instructs the second station to switch from a receiving state of receiving the OSC data to a silent state of waiting for the OTDR probe.

5. The method according to claim 4, further comprising:
after the first station sends the OTDR pulse to the second station and before the first station sends the OSC data to the second station:
  sending, by the first station, a preset physical layer recovery message to the second station, wherein the preset physical layer recovery message instructs the second station to switch from the silent state of waiting for the OTDR probe to the receiving state of receiving the OSC data; and
  in response to determining that a preset physical layer recovery acknowledgment message fed back by the second station is received, sending, by the first station, the OSC data to the second station.

6. The method according to claim 5, further comprising:
after the sending, by the first station, the preset physical layer recovery message to the second station:
sending, by the first station, the OSC data to the second station in response to determining that the preset physical layer recovery acknowledgment message fed back by the second station is not received during a preset duration.

7. An optical supervisory apparatus, comprising at least: an optical time domain reflectometer (OTDR), an optical supervisory channel (OSC) circuit, and a switching controller, wherein:
  the OTDR is configured to send an OTDR pulse, and obtain an OTDR probe value according to received reflection light returned by the OTDR pulse by using an optical fiber between a first station and a second station, wherein the optical supervisory apparatus is located on the first station, the second station is a neighboring station of the first station, and the first station is an Optical Terminal Multiplexer (OTM) station;
  the OSC circuit is configured to send first OSC data to the second station and receive second OSC data sent by the second station; and
  the switching controller is configured to control the OTDR and the OSC circuit to perform alternate sending of the OTDR pulse and the first OSC data in response to receiving, by the optical supervisory apparatus, an OTDR probe instruction from a network management system, and forward the second OSC data sent by the second station to the OSC circuit, wherein a pattern of alternately sending the OTDR pulse and the first OSC data is based on the OTDR probe instruction.

8. The optical supervisory apparatus according to claim 7, wherein the optical supervisory apparatus further comprises a buffer, and the buffer is configured to buffer OSC data generated when the OTDR sends the OTDR pulse.

9. The optical supervisory apparatus according to claim 7, wherein the optical supervisory apparatus further comprises an optical-to-electrical converter, and the optical-to-electrical converter is configured to convert the OTDR pulse to a first optical signal, convert an electrical signal corresponding to the first OSC data to a second optical signal, and convert a received optical signal corresponding to the second OSC data to a corresponding electrical signal.

10. A station, comprising at least an optical supervisory apparatus, the optical supervisory apparatus comprising at least: an optical time domain reflectometer (OTDR), an optical supervisory channel (OSC) circuit, and a switching controller, wherein:
  the OTDR is configured to send an OTDR pulse, and obtain an OTDR probe value according to received reflection light returned by the OTDR pulse by using an optical fiber between the station and a second station, wherein the optical supervisory apparatus is located on the station, the second station is a neighboring station of the station, and the station is an Optical Terminal Multiplexer (OTM) station;
  the OSC circuit is configured to send first OSC data to the second station and receive second OSC data sent by the second station; and
  the switching controller is configured to control the OTDR and the OSC circuit to perform alternate sending of the OTDR pulse and the first OSC data in response to receiving, by the station, an OTDR probe instruction from a network management system, and forward the second OSC data sent by the second station to the OSC circuit, wherein a pattern of alternately sending the OTDR pulse and the first OSC data is based on the OTDR probe instruction.

11. The station according to claim 10, wherein the optical supervisory apparatus further comprises a buffer, and the buffer is configured to buffer OSC data generated when the OTDR sends the OTDR pulse.

12. The station according to claim 10, wherein the optical supervisory apparatus further comprises an optical-to-electrical converter, and the optical-to-electrical converter is configured to convert the OTDR pulse to a first optical signal, convert an electrical signal corresponding to the first OSC data to a second optical signal, and convert a received optical signal corresponding to the second OSC data to a corresponding electrical signal.

* * * * *